Patented Nov. 3, 1936

2,059,569

UNITED STATES PATENT OFFICE 2,059,569

MANUFACTURE OF HYDROGEN PEROXIDE

George W. Filson, Kenmore, N. Y., and James H. Walton, Madison, Wis., assignors of one-third to William S. Pritchard, Mount Vernon, N. Y.

No Drawing. Application April 13, 1933, Serial No. 665,952

15 Claims. (Cl. 23—207)

This invention relates to the preparation of hydrogen peroxide and more particularly to the direct preparation of hydrogen peroxide of high concentration.

Prior to the instant invention, one of the methods employed for the preparation of hydrogen peroxide comprised treating a peroxide of an alkali or alkaline earth metal, such as barium peroxide, with a dilute acid, such as, for example, sulphuric acid. In this procedure, the reaction was effected in the presence of aqueous mediums with the result that a dilute solution of hydrogen peroxide was secured. As a consequence, large equipment for a given production was necessary. Additional equipment was required for concentrating the product which increased the cost of the production of a concentrated product.

The foregoing procedure had still another disadvantage. The hydrogen peroxide which was obtained was impure. It contained several undesirable characteristics, for example, a high salt content, etc. To purify such a composition, such as by distillation, resulted in a still further increase in the cost.

When a pure grade of hydrogen peroxide was desired, a method was employed which consisted in oxidizing an inorganic acid, such as sulphuric acid, to persulphuric acid, decomposing the latter, and distilling the resulting hydrogen peroxide solution under vacuum. This procedure also had several disadvantages. The distillation of the hydrogen peroxide solution was a cumbersome and expensive procedure in that it required expensive apparatus and skilled operators. Moreover, due to the fact that the hydrogen peroxide decomposed during the distillation operation, the yield was very seriously affected, especially when a hydrogen peroxide of high concentration, such as 80% by weight, was desired.

We have found that we can economically prepare hydrogen peroxide of high concentration and high purity by oxidizing autoxidizable organic compounds dissolved in a solvent which has a slight affinity for hydrogen peroxide, and subsequently separating the hydrogen peroxide from the said solvent.

It is therefore an object of this invention to directly prepare hydrogen peroxide of high concentration and high purity.

Another object of this invention is the direct preparation of hydrogen peroxide by oxidizing an organic compound dissolved in a solvent which has slight affinity for hydrogen peroxide, and subsequently removing the hydrogen peroxide.

Additional objects of the invention will become apparent from the following description and appended claims.

In accordance with the principles of the instant invention, an organic compound yielding hydrogen peroxide on oxidation and dissolved in a solvent in which hydrogen peroxide is insoluble is oxidized. Due to the fact that the hydrogen peroxide is insoluble in the liquid medium, the former becomes suspended in the latter and is separated in any convenient manner, such as settling, filtering, centrifuging or the like. In the preferred embodiment of the invention, the organic compound is of such a nature that after oxidation the oxidized residue can be reduced and then again oxidized to produce the hydrogen peroxide. In other words, the organic substance is of such a nature that the process, in the preferred embodiment, is capable of being carried out in cycles. As a consequence, the process is made very economical.

The organic compounds contemplated in the broad aspects of the instant invention are autoxidizable and spontaneously yield hydrogen peroxide on oxidization. As above explained, in the preferred embodiment, the autoxidizable compound, in addition to yielding hydrogen peroxide, also yields a substance which upon reduction gives the original autoxidizable compound, whereby the process may be repeated and carried out in cycles. As illustrative examples of only a few of the numerous organic compounds of the preferred type and which have given satisfactory results may be mentioned hydrazobenzene, hydrazotoluene, paraethylhydrazobenzene, phenylhydroxylamine, hydrazotriazol, hydrazomethyltriazol, dibrom-p-oxybenzaldehyde phenylhydrazone, anthrahydroquinone, indigo white, dihydrophenanthrenchinon. It is to be understood that the invention is not restricted to these precise compounds mentioned.

The liquid vehicle which the instant invention contemplates is a solvent for the autoxidizable organic compound and preferably also a solvent for organic residue formed in reaction. The solubility characteristics of the liquid vehicle with respect to hydrogen peroxide depend on the concentration of hydrogen peroxide to be produced. Thus, when a relatively high concentration, such as 90%, is desired, the vehicle which is used is of the type in which hydrogen peroxide is only slightly soluble. On the other hand, when a more dilute solution, such as 30% or less, is desired, the vehicle may be one which has a slightly greater affinity, i. e., solubility characteristic for hydrogen peroxide. In this case, the hydrogen peroxide dissolved in the vehicle may be removed therefrom by washing with water. The term "insoluble" used in this specification in connection with the solubility characteristics of the vehicle for hydrogen peroxide is intended to cover the foregoing subject matter.

The oxidation of the compound may be effected by means of any well-known oxidizing agent. For obvious reasons, oxidizing agents which do not introduce any extraneous substances are preferred. As illustrative examples of the preferred oxidizing agents may be mentioned oxygen, ozone and air.

The reaction may be satisfactorily conducted over a wide range of temperatures, such as from the freezing point of the solution to approximately 50° C. or even higher. In general, the process is more efficient at low temperatures. However, the efficiency at the very low temperatures is out of proportion to the cost of maintaining such temperatures. For this reason, temperatures in the neighborhood of 5° C., 10° C. or 20° C. are preferred. If for any reason a temperature in excess of approximately 40° C.–50° C. is employed, it is advantageous to maintain a dispersion of water in the solvent during oxidation to dilute the hydrogen peroxide being formed.

The oxidation reaction may be carried out under a wide range of pressure conditions, such as from atmospheric to 400 pounds per square inch. Generally, the rate of reaction is proportional to the pressure. The reaction may be carried out in suitable apparatus maintained at a pressure above or below atmospheric pressure.

It is possible to carry the reactions to completion, but since this is at the expense of the efficiency of the process, an incomplete oxidation and reduction of the organic materials are preferred. The degree of oxidation and reduction are to be chosen with respect to the individual compound being oxidized and in keeping with the economical operation of the particular apparatus at hand. For example, it might be desirable to operate between the limits of 70% reduced and 30% reduced in the case of hydrazobenzene, while in the case of hydrazotoluene with the same type of apparatus it might be desirable to operate between the limits of 90% reduction and 50% reduction.

The solution of the organic substance in the selected solvent may be of various concentrations. In so far as the principles of the instant invention are concerned, the concentration of the organic substance in the solution may vary from 0.1% to a saturated solution, the concentration, of course, being chosen with respect to the various factors, such as the solubility of the particular compound in the selected or chosen solvent.

In order to more fully explain the instant invention, several illustrative examples are set forth. It is to be understood that these examples are merely for the purpose of illustrating the principles of the instant invention and in no wise limit the invention.

*Example I.*—A 5% solution of hydrazobenzene in benzene is thoroughly agitated with air or oxygen at about 10° C. to preferably a partial oxidation. As the oxidation proceeds, the reaction product automatically splits into azobenzene and hydrogen peroxide. Due to the fact that hydrogen peroxide is insoluble in the benzene, it becomes finely dispersed therein and at the end of the reaction it is separated by settling, filtering, centrifuging or the like.

The azobenzene solution is then emulsified in a 3% caustic soda solution and reduced electrolytically. Subsequently, the benzene solution of the hydrazobenzene is separated and the process set forth above in the paragraph immediately preceding repeated.

The hydrogen peroxide separated from the reaction mass analyzes 95% hydrogen peroxide and contains small amounts of impurities, such as benzene, which, if desired, may be removed by simple steam distillation.

*Example II.*—A 0.1% solution of hydrazotoluene in gasoline at 5° C. is treated with air or oxygen as in Example I, resulting in a dispersion of hydrogen peroxide in a gasoline solution of azotoluene.

The hydrogen peroxide is separated as explained in Example I and is available for use.

The azotoluene is catalytically reduced under hydrogen pressure, and the resulting solution of hydrazotoluene in gasoline is separated and the process set forth immediately above repeated.

*Example III.*—A 0.5% paraethylhydrazobenzene solution in chloroform at 20° C. is treated with air or oxygen, whereby hydrogen peroxide dispersed in a chloroform solution of paraethylazobenzene is produced. The hydrogen peroxide is separated, and is available for use.

The paraethylazobenzene is catalytically reduced under hydrogen pressure and the resulting solution of paraethylhydrazobenzene in chloroform separated and the process set forth above repeated.

*Example IV.*—A 3% solution of anthrahydroquinone in nitrobenzene is treated at 20° C. with oxygen, resulting in the formation of hydrogen peroxide dispersed in a nitrobenzene solution of anthraquinone. The hydrogen peroxide is then separated from the solution. The anthraquinone is separated from the nitrobenzene in any well-known manner and reduced with zinc in a sodium hydroxide solution. The anthrahydroquinone thus formed is precipitated by the addition of a slight excess of hydrochloric acid and, after separation, again dissolved in nitrobenzene and the process set forth repeated.

*Example V.*—A 3% solution of anthrahydroquinone in methyl salicylate is treated at 20° C. with oxygen, resulting in the formation of hydrogen peroxide dispersed in a methyl salicylate solution of anthraquinone. The hydrogen peroxide is separated and the resulting solution of anthraquinone in methyl salicylate is reduced catalytically under pressure of hydrogen to anthrahydroquinone and the process set forth repeated.

As is apparent from the foregoing, the instant process provides a simple and economical process of producing hydrogen peroxide in a high degree of purity and concentration easily obtainable as high as 90%, and a theoretical concentration of 100%. To produce solutions of hydrogen peroxide of any lower concentration it is only necessary to wash the organic solvent with a predetermined quantity of water or dilute the hydrogen peroxide after separation.

Since it is obvious that various changes and modifications may be made in the above description without departing from the nature or spirit thereof, this invention is not restricted thereto except as set forth in the appended claims.

We claim:

1. A method of producing hydrogen peroxide which comprises oxidizing an autoxidizable organic compound which at least yields hydrogen peroxide upon oxidation and which is dissolved in a solvent in which hydrogen peroxide is insoluble, and in which solvent the other oxidation product of said reaction is soluble, and separating the hydrogen peroxide from the solution.

2. A method of producing hydrogen peroxide which comprises oxidizing an autoxidizable organic compound which at least yields hydrogen peroxide upon oxidation and which is dissolved in a solvent in which hydrogen peroxide is insoluble, and in which solvent the other oxidation product of said reaction is soluble, said other oxidation product yielding the original autoxidizable compound on reduction, separating the hydrogen peroxide from the solution, reducing the other oxidation product formed in the oxidizing reaction to produce the original autoxidizable organic compound and repeating the aforementioned steps of the process utilizing the autoxidizable organic compound produced thereby.

3. A method of producing hydrogen peroxide which comprises partially oxidizing an autoxidizable organic compound which at least yields hydrogen peroxide upon oxidation and which is dissolved in a solvent in which hydrogen peroxide is insoluble, and in which solvent the other oxidation product of said reaction is soluble, and separating the hydrogen peroxide from the solution.

4. A method of producing hydrogen peroxide which comprises partially oxidizing an autoxidizable organic compound which at least yields hydrogen peroxide upon oxidation and which is dissolved in a solvent in which hydrogen peroxide is insoluble, and in which solvent the other oxidation product of said reaction is soluble, said other oxidation product yielding the original autoxidizable compound on reduction, separating the hydrogen peroxide from the solution, reducing the second-named substance formed in the oxidizing reaction to produce the original autoxidizable organic compound and repeating the aforementioned steps of the process utilizing the autoxidizable organic compound produced thereby.

5. A method of producing hydrogen peroxide which comprises partially oxidizing an autoxidizable organic compound which at least yields hydrogen peroxide upon oxidation and which is dissolved in a solvent in which hydrogen peroxide is insoluble, to yield hydrogen peroxide and a substance which upon reduction will yield the original autoxidizable compound, separating the hydrogen peroxide from the solution, partially reducing the other oxidation product formed in the oxidizing reaction to produce the original autoxidizable organic compound and repeating the aforementioned steps of the process utilizing the autoxidizable organic compound produced thereby.

6. A method of producing hydrogen peroxide which comprises oxidizing an autoxidizable organic compound which at least yields hydrogen peroxide upon oxidation and which is dissolved in a solvent in which hydrogen peroxide is insoluble, and in which solvent the other oxidation product of said reaction is soluble, and separating the hydrogen peroxide from the solution, the autoxidizable compound having the formula RXR', wherein X designates a —NH—, NNH—, —NH—NH— group, R designates a phenyl radical, a substituted phenyl radical, an azole group, or a substituted azole group, and R' designates an OH group, a phenyl radical, a substituted phenyl radical, an azole group, or a substituted azole group.

7. A method of producing hydrogen peroxide which comprises oxidizing an autoxidizable organic compound which at least yields hydrogen peroxide upon oxidation and which is dissolved in a solvent in which hydrogen peroxide is insoluble, and in which solvent the other oxidation product of said reaction is soluble, said other oxidation product yielding the original autoxidizable compound on reduction, separating the hydrogen peroxide from the solution, reducing the second-named substance formed in the oxidizing reaction to produce the original autoxidizable organic compound, the autoxidizable compound having the formula RXR', wherein X designates a —NH—, NNH—, —NH—NH— group, R designates a phenyl radical, a substituted phenyl radical, an azole group, or a substituted azole group, and R' designates an OH group, a phenyl radical, a substituted phenyl radical, an azole group, or a substituted azole group and repeating the aforementioned steps of the process utilizing the autoxidizable organic compound produced thereby.

8. A method of preparing hydrogen peroxide which comprises oxidizing a hydroazo compound of benzene which at least yields hydrogen peroxide upon oxidation and which is dissolved in a solvent in which hydrogen peroxide is insoluble and in which solvent the other oxidation product of said reaction is soluble, to yield hydrogen peroxide dispersed in said solvent and an azo compound dissolved in said solvent, and separating the hydrogen peroxide from the solution.

9. A method of preparing hydrogen peroxide which comprises oxidizing a hydroazo compound of benzene which at least yields hydrogen peroxide upon oxidation and which is dissolved in a solvent in which hydrogen peroxide is insoluble and in which solvent the other oxidation product of said reaction is soluble, to yield hydrogen peroxide dispersed in said solvent and an azo compound dissolved in said solvent, separating the hydrogen peroxide from the solution, reducing the azo compound to the hydroazo compound and repeating the aforementioned steps of the process utilizing the hydroazo compound produced thereby.

10. A method of preparing hydrogen peroxide which comprises oxidizing hydroazobenzene dissolved in a solvent in which hydrogen peroxide is insoluble and in which solvent the other oxidation product of said reaction is soluble, to yield hydrogen peroxide dispersed in said solvent and an azo compound dissolved in said solvent, separating the hydrogen peroxide from the solution, reducing the azo compound to the hydroazo compound and repeating the aforementioned steps of the process utilizing the hydroazo compound produced thereby.

11. A method of preparing hydrogen peroxide which comprises oxidizing hydroazotoluene dissolved in a solvent in which hydrogen peroxide is insoluble and in which solvent the other oxidation product of said reaction is soluble, to yield hydrogen peroxide dispersed in said solvent and an azo compound dissolved in said solvent, separating the hydrogen peroxide from the solution, reducing the azo compound to the hydroazo compound and repeating the aforementioned steps of the process utilizing the hydroazo compound produced thereby.

12. A method of preparing hydrogen peroxide which comprises oxidizing anthrahydroquinone dissolved in a solvent in which hydrogen peroxide is insoluble and in which solvent the oxidation product of said reaction is soluble, to yield hydrogen peroxide dispersed in said solvent and anthraquinone dissolved in said solvent, separating the hydrogen peroxide, reducing the anthraquinone to anthrahydroquinone and repeating the aforementioned steps of the process utilizing the anthrahydroquinone produced thereby.

13. A method of preparing an aqueous solution of hydrogen peroxide which comprises oxidizing an autoxidizable organic compound, which at least yields hydrogen peroxide upon oxidation and which is dissolved in a solvent in which hydrogen peroxide is insoluble and in which solvent the other oxidation product is soluble, maintaining a dispersion of water in said solvent during oxidation to dilute the hydrogen peroxide, and separating the dilute hydrogen peroxide from the solution.

14. A method of preparing an aqueous solution of hydrogen peroxide which comprises oxidizing an autoxidizable organic compound, which at least yields hydrogen peroxide upon oxidation and which is dissolved in a solvent in which hydrogen peroxide is insoluble and in which solvent the other oxidation product is soluble, maintaining a dispersion of water in said solvent during oxidation to dilute the hydrogen peroxide, separating the dilute hydrogen peroxide from the solution, reducing the other oxidation product to produce the original autoxidizable compound, and repeating the aforementioned steps utilizing the autoxidizable compound produced thereby.

15. A method of preparing hydrogen peroxide which comprises oxidizing an autoxidizable organic compound which at least yields hydrogen peroxide upon oxidation and which is dissolved in a solvent in which hydrogen peroxide is insoluble and in which solvent the other oxidation product is soluble, separating the hydrogen peroxide from the solution, separating the said other oxidation product from the solution, reducing said other oxidation product to produce the original autoxidizable organic compound, and repeating the aforementioned steps utilizing the autoxidizable organic substance produced thereby.

GEORGE W. FILSON.
JAMES H. WALTON.